US011133640B2

(12) United States Patent
Anderson et al.

(10) Patent No.: US 11,133,640 B2
(45) Date of Patent: Sep. 28, 2021

(54) INTEGRATED BEAM SCRAPER AND POWER DUMP

(71) Applicant: Raytheon Company, Waltham, MA (US)

(72) Inventors: Timothy C. Anderson, McKinney, TX (US); Adam R. Girard, Blue Ridge, TX (US)

(73) Assignee: Raytheon Company, Waltham, MA (US)

( * ) Notice: Subject to any disclaimer, the term of this patent is extended or adjusted under 35 U.S.C. 154(b) by 103 days.

(21) Appl. No.: 16/433,077

(22) Filed: Jun. 6, 2019

(65) Prior Publication Data

US 2020/0388982 A1    Dec. 10, 2020

(51) Int. Cl.
*H01S 3/11*    (2006.01)
*H01S 3/00*    (2006.01)
*H01S 3/02*    (2006.01)
*H01S 3/04*    (2006.01)

(52) U.S. Cl.
CPC .......... *H01S 3/1103* (2013.01); *H01S 3/0071* (2013.01); *H01S 3/02* (2013.01); *H01S 3/0407* (2013.01)

(58) Field of Classification Search
CPC ........ H01S 3/1103; H01S 3/0071; H01S 3/02; H01S 3/0407; H01S 3/0401; H01S 3/10023; H01S 3/2308; H01S 3/005; G02B 5/006; G02B 7/1815; G02B 5/003
See application file for complete search history.

(56) References Cited

U.S. PATENT DOCUMENTS

| | | | |
|---|---|---|---|
| 3,698,797 A | 10/1972 | Brown | |
| 4,271,396 A | 6/1981 | Brown | |
| 4,511,216 A | 4/1985 | Hsu et al. | |
| 5,745,293 A | 4/1998 | Lassalle | |

(Continued)

FOREIGN PATENT DOCUMENTS

| | | |
|---|---|---|
| DE | 10033785 A1 | 1/2002 |
| EP | 1003252 A2 | 5/2000 |

(Continued)

OTHER PUBLICATIONS

International Search Report and Written Opinion of the International Searching Authority in connection with International Patent Application No. PCT/US2020/019963 dated Jun. 24, 2020, 12 pages.

(Continued)

*Primary Examiner* — Xinning(Tom) Niu

(57) ABSTRACT

An apparatus includes a base that includes a raised surface and a first opening through the raised surface. The apparatus also includes a cover configured to be coupled to the base in order to form a cavity, where the cover includes a second opening through the cover. The raised surface is configured to allow passage of a first portion of optical energy through the first opening and to reflect a second portion of the optical energy. Portions of the cover and the base surrounding the cavity are configured to absorb the reflected second portion of the optical energy. The base may further include one or more baffles positioned around the raised surface, and/or the cover may further include one or more baffles positioned around the second opening.

20 Claims, 7 Drawing Sheets

(56) References Cited

U.S. PATENT DOCUMENTS

| | | |
|---|---|---|
| 6,301,277 B1 | 10/2001 | Tinti et al. |
| 6,421,364 B2 | 7/2002 | Lubrano |
| 6,480,515 B1 | 11/2002 | Wilson |
| 7,133,177 B2 | 11/2006 | Tamaru |
| 7,245,409 B2 | 7/2007 | Tamaru |
| 7,293,886 B2 | 11/2007 | Holmgren et al. |
| 7,903,351 B2 | 3/2011 | Clar et al. |
| 9,202,488 B2 | 12/2015 | Peng et al. |
| 9,742,142 B1 | 8/2017 | Koontz et al. |
| 2004/0233960 A1 | 11/2004 | Vetrovec |
| 2004/0258123 A1 | 12/2004 | Zamel et al. |
| 2005/0058173 A1* | 3/2005 | Vetrovec ............... H01S 3/042 372/66 |
| 2009/0185588 A1* | 7/2009 | Munroe ............... H01S 3/2308 372/22 |
| 2010/0110556 A1* | 5/2010 | Chann ............... H01S 5/4062 359/619 |
| 2012/0026749 A1 | 2/2012 | Armstrong |
| 2017/0299857 A1 | 10/2017 | Kurosawa et al. |
| 2017/0346253 A1 | 11/2017 | Koontz et al. |
| 2018/0191129 A1* | 7/2018 | Wheeler ............... G02F 1/3501 |

FOREIGN PATENT DOCUMENTS

| | | |
|---|---|---|
| EP | 1480299 A1 | 11/2004 |
| EP | 1492207 A2 | 12/2004 |
| EP | 1758216 A1 | 2/2007 |
| EP | 2324949 A1 | 5/2011 |

OTHER PUBLICATIONS

International Search Report and Written Opinion of the International Searching Authority in connection with International Patent Application No. PCT/US2017/015997 dated May 29, 2017, 10 pages.

* cited by examiner

US 11,133,640 B2

INTEGRATED BEAM SCRAPER AND POWER DUMP

GOVERNMENT RIGHTS

This invention was made with U.S. government support under contract no. W9113M-17-D-0006-0002 awarded by the U.S. Department of Defense. The U.S. government may have certain rights in this invention.

TECHNICAL FIELD

This disclosure is generally directed to laser systems. More specifically, this disclosure is directed to an integrated beam scraper and power dump.

BACKGROUND

High-power laser systems are being developed for a number of commercial and military applications. In various laser systems, an optical signal is amplified to generate an output beam having a higher power, such as when a master oscillator generates a low-power optical signal that is then amplified by a power amplifier to generate a high-power output beam. In some cases, it may be necessary or desirable to resize a high-power output beam or other optical beam by "scraping" the optical beam, which is often accomplished using a beam scraper having a reflective surface. A small portion of the optical beam is redirected by the reflective surface to a power dump (also called a beam dump), and the power dump absorbs the reflected portion of the optical beam.

SUMMARY

This disclosure provides an integrated beam scraper and power dump.

In a first embodiment, an apparatus includes a base that includes a raised surface and a first opening through the raised surface. The apparatus also includes a cover configured to be coupled to the base in order to form a cavity, where the cover includes a second opening through the cover. The raised surface is configured to allow passage of a first portion of optical energy through the first opening and to reflect a second portion of the optical energy. Portions of the cover and the base surrounding the cavity are configured to absorb the reflected second portion of the optical energy.

In a second embodiment, a system includes a laser configured to generate an optical beam and a beam scraper and power dump configured to scrape the optical beam. The beam scraper and power dump includes a base that includes a raised surface and a first opening through the raised surface. The beam scraper and power dump also includes a cover configured to be coupled to the base in order to form a cavity, where the cover includes a second opening through the cover. The raised surface is configured to allow passage of a first portion of the optical beam through the first opening and to reflect a second portion of the optical beam. Portions of the cover and the base surrounding the cavity are configured to absorb the reflected second portion of the optical beam.

In a third embodiment, a method includes passing an optical beam through a cover of a beam scraper and power dump. The method also includes passing a first portion of the optical beam through an opening in a raised surface located on a base of the beam scraper and power dump. The method further includes reflecting a second portion of the optical beam from the raised surface into a cavity of the beam scraper and power dump. In addition, the method includes absorbing the reflected second portion of the optical beam using portions of the cover and the base surrounding the cavity.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
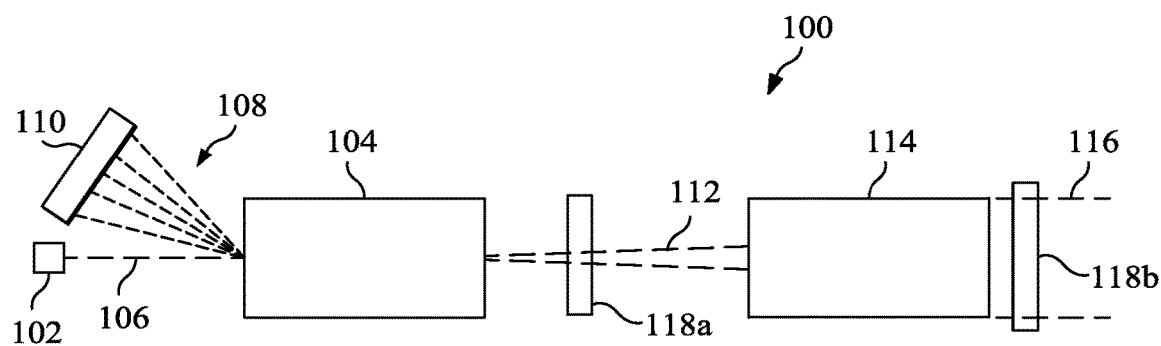
FIG. 1 illustrates an example laser system with an integrated beam scraper and power dump according to this disclosure.

FIGS. 1 through 7, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, beam scrapers and power dumps are often used in laser systems, such as to resize a high-power output beam or other optical beam. A beam scraper typically includes a reflective surface that redirects at least one portion of an optical beam to a power dump. The power dump absorbs and terminates optical energy redirected or "scraped" by the reflective surface. One or more other portions of the optical beam are provided as output, which effectively allows the beam scraper to resize the optical beam.

Unfortunately, the use of a reflective surface may allow stray optical energy to miss a power dump and strike other components of a laser system or a larger device or system that includes the laser system, which can damage those components. Also, heating of the air around the reflective surface can introduce wavefront errors in a high-power optical beam, which may require the use of additional components for compensation. In addition, some laser systems can be volume- or weight-constrained, meaning there may be a specific limit placed on the size or weight of a laser system. As a result, there may be various circumstances where it is difficult or even impossible to provide a beam scraper and a separate power dump.

This disclosure provides an integrated beam scraper and power dump in which beam scraping and power dump features are integrated into a single structure. As described in more detail below, a beam scraper stage of the structure includes precision beam scraping features that can reflect optical energy into a power dump stage of the structure and possibly absorb optical energy itself. The power dump stage of the structure includes a light-trapping cavity that absorbs the reflected optical energy. In some embodiments, the beam scraping features can be gold-plated or otherwise highly reflective (at least at the laser wavelength or wavelengths) to ensure that little if any optical energy is absorbed by the beam scraping features, although this is not required. Also, in some embodiments, the power dump stage can include integrated baffles and black-chrome plating or other highly-absorptive materials (at least at the laser wavelength or wavelengths) to capture and terminate all or substantially all of the reflected optical energy, although again this is not required. A fluid coolant can be circulated through one or more portions of the structure or other cooling mechanisms can be used in order to remove thermal energy and actively cool at least the one or more portions of the structure.

In this way, both a beam scraper and a power dump can be incorporated into a single integral structure, which can significantly reduce the volume and/or weight needed for the beam scraper and the power dump functionality. Also, the beam scraper stage of the structure can more effectively distribute optical energy into the power dump stage of the structure. This can help to increase the absorption of the optical energy by the power dump stage, facilitate easier cooling of the structure, and reduce the formation of hot spots in the structure. Further, the beam scraper and power dump structure can substantially reduce or eliminate stray irradiance exiting the structure. In addition, the beam scraper and power dump structure can substantially reduce or eliminate the formation of heated air that might introduce wavefront errors in a high-power output beam or other optical beam.

FIG. 1 illustrates an example laser system 100 with an integrated beam scraper and power dump according to this disclosure. As shown in FIG. 1, the laser system 100 includes a master oscillator 102 and a power amplifier 104. The laser system 100 therefore has a master oscillator/power amplifier (MOPA) configuration, although other types of laser systems can also be used.

The master oscillator 102 generally operates to generate low-power optical signals 106. The low-power optical signals 106 can denote any suitable optical signals having relatively low power. For example, the low-power optical signals 106 can include optical signals having a continuous wave (CW) output, a continuous pulse train (CPT), a pulse burst, or any of various other waveforms. The master oscillator 102 includes any suitable structure for generating one or more low-power optical signals. In some embodiments, the master oscillator 102 includes a fiber laser.

The power amplifier 104 receives the low-power optical signals 106 from the master oscillator 102 and pump power 108 from one or more pump sources 110. The power amplifier 104 generally operates to amplify the low-power optical signals 106 and generate high-power optical signals 112. For example, the power amplifier 104 can amplify a low-power CW or other optical signal into a high-power CW or other optical signal having ten kilowatts of power or more. The received pump power 108 provides the necessary population inversion in the power amplifier's gain medium for this amplification. The power amplifier 104 includes any suitable structure for amplifying optical signals. In some embodiments, the power amplifier 104 includes at least one planar waveguide as its gain medium. Each pump source 110 includes any suitable structure for generating optical power used by a power amplifier for amplification. In some embodiments, each pump source 110 includes one or more laser diodes, such as one or more laser diode arrays, or other light sources.

The high-power optical signals 112 are provided to an output expander and collimator 114, which produces a high-power output beam 116. The output expander and collimator 114 includes any suitable structure for expanding and collimating optical signals, such as one or more optical devices like mirrors and lenses. However, any other or additional modifications can be made to the high-power optical signals 112 to generate the high-power output beam 116 or other desired optical beam(s).

As noted above, it may be necessary or desirable to resize a high-energy output beam or other optical beam. In FIG. 1, for example, the high-power optical signals 112 may need to be resized prior to entering the output expander and collimator 114. As another example, the high-power output beam 116 may need to be resized prior to reaching a beam director or other component that uses or interacts with the high-power output beam 116 in some manner.

In accordance with this disclosure, at least one integrated beam scraper and power dump 118a-118b may be provided in the laser system 100. As described in more detail below, each beam scraper and power dump 118a-118b includes a beam scraper stage that can reflect a portion of received optical energy (and that can possibly absorb another portion of the received optical energy) while allowing the bulk of the received optical energy to pass. Each beam scraper and power dump 118a-118b also includes a power dump stage that can receive and absorb the optical energy reflected by the beam scraper stage. Fluid cooling or other cooling mechanisms may be used to cool one or more portions of each beam scraper and power dump 118a-118b.

By using at least one beam scraper and power dump 118a-118b, an optical beam can be easily resized by effectively terminating any scraped portions of the optical beam. This can be accomplished using an integrated structure, which can have a smaller volume and/or a smaller weight compared to conventional beam scrapers and beam dumps. This can also be accomplished with little if any stray irradiance exiting the at least one beam scraper and power dump 118a-118b. In addition, little or no wavefront errors may be introduced to the optical beam by the at least one beam scraper and power dump 118a-118b.

Each beam scraper and power dump 118a-118b can be formed from any suitable materials. For example, the majority of each beam scraper and power dump 118a-118b may be referred to as a substrate and may be formed from one or more metals, such as aluminum, aluminum alloy, copper, or copper alloy. The beam scraper stage of each beam scraper and power dump 118a-118b may include gold plating or other highly-reflective materials over the metal or other substrate, or the beam scraper stage of each beam scraper and power dump 118a-118b may include black-chrome plating or other highly-absorptive materials over the metal or other substrate. The power dump stage of each beam scraper and power dump 118a-118b may include black-chrome plating or other highly-absorptive materials over the metal or other substrate. Specific examples of black-chrome plating may include an ANOBLACK EC coating or an ANOBLACK CR coating from ANOPLATE CORP. Note that some coatings, such as the ANOBLACK EC coating, may be suitable for use directly on an aluminum substrate. For other coatings such as the ANOBLACK CR coating, nickel plating or other materials may first be deposited on the aluminum substrate prior to formation of the coating. Of course, the actual materials used in the coatings or platings can vary based (at least partially) on the materials used to form the remainder of the beam scraper and power dump 118a-118b.

Each beam scraper and power dump 118a-118b can also be formed in any suitable manner. For example, the aluminum, copper, or other substrate of a beam scraper and power dump 118a-118b can be formed via machining, casting, injection molding, additive manufacturing, or other suitable techniques. Various coatings or platings can be formed on the aluminum, copper, or other substrate in any suitable manner, such as electro-deposition, anodization or electrolytic passivation, or physical vapor deposition (PVD). The actual formation techniques for the various coatings or platings can vary based on the materials used in the coatings or platings.

The beam scrapers and power dumps 118a-118b described in this patent document can find use in a number of applications. For example, the beam scrapers and power dumps 118a-118b can be used with various high-power laser systems, such as laser systems used in a number of commercial and military applications. Some general types of laser systems include High Energy Laser (HEL) systems and Light Detection and Ranging (LIDAR) systems. The following discussion provides a description of various example commercial applications. However, the following discussion does not limit this disclosure to any particular applications.

The beam scrapers and power dumps 118a-118b described here may find use in commercial mining applications, such as in drilling, mining, or coring operations. For instance, high-power laser systems with the beam scrapers and power dumps 118a-118b may be used to soften or weaken an earth bed prior to drilling through the earth bed using drill bits. This may allow for fewer drill bit changes and extended lifetimes and reliabilities of the drill bits. Here, free-space propagation of a high-power laser beam from an output window of a laser system may be used, allowing deeper penetration at further distances compared to conventional fiber lasers.

The beam scrapers and power dumps 118a-118b may also find use in remote laser welding, cutting, drilling, or heat treating operations, such as in industrial or other automation settings. The use of a high-power and high-beam quality laser system with at least one beam scraper and power dump 118a-118b allows the processing of thicker materials to occur at larger working distances from the laser system while minimizing the heat-affected zone and maintaining vertical or other cut lines. Among other things, this helps to support welding or cutting operations where proximity to the weld or cut site is difficult or hazardous. It also helps to protect the laser system and possibly any human operators from smoke, debris, or other harmful materials.

The beam scrapers and power dumps 118a-118b may further find use in construction and demolition operations. Example operations may include metal resurfacing or deslagging, paint removal, and industrial demolition operations. High-power laser systems that include beam scrapers and power dumps 118a-118b can be used to ablate material much faster and safer compared to conventional operations. As a particular example of this functionality, high-power laser systems with the beam scrapers and power dumps 118a-118b may be used to support demolition of nuclear reactors or other hazardous structures. Here, the high-power laser systems may be used to cut through contaminated structures like contaminated concrete or nuclear containment vessels or reactors from long distances. This helps to avoid the use of water jet cutting or other techniques that create hazardous waste, such as contaminated water. It also provides improved safety since human operators can remain farther away from contaminated structures being demolished.

A number of additional applications are possible. For example, high-power laser systems with the beam scrapers and power dumps 118a-118b may find use in power beaming applications, where high-power laser beams are targeted to photovoltaic (solar) cells of remote devices to be recharged. High-power laser systems with the beam scrapers and power dumps 118a-118b may also find use in hazardous material (HAZMAT) applications, where the laser systems are used to heat and decompose hazardous materials into less harmful or non-harmful materials.

Although FIG. 1 illustrates one example of a laser system 100 with an integrated beam scraper and power dump, various changes may be made to FIG. 1. For example, a laser system may include a single beam scraper and power dump 118a-118b, or the laser system may include multiple beam scrapers and power dumps 118a-118b. Also, the sizes, shapes, and relative dimensions of the various components in FIG. 1 are for illustration only. Further, the specific arrangement of components in FIG. 1 can vary as needed or desired. In addition, FIG. 1 illustrates one example environment in which at least one beam scraper and power dump 118a-118b can be used. One or more beam scrapers and power dumps 118a-118b can find use in any other suitable system (including non-MOPA laser systems).

Figure 2A:
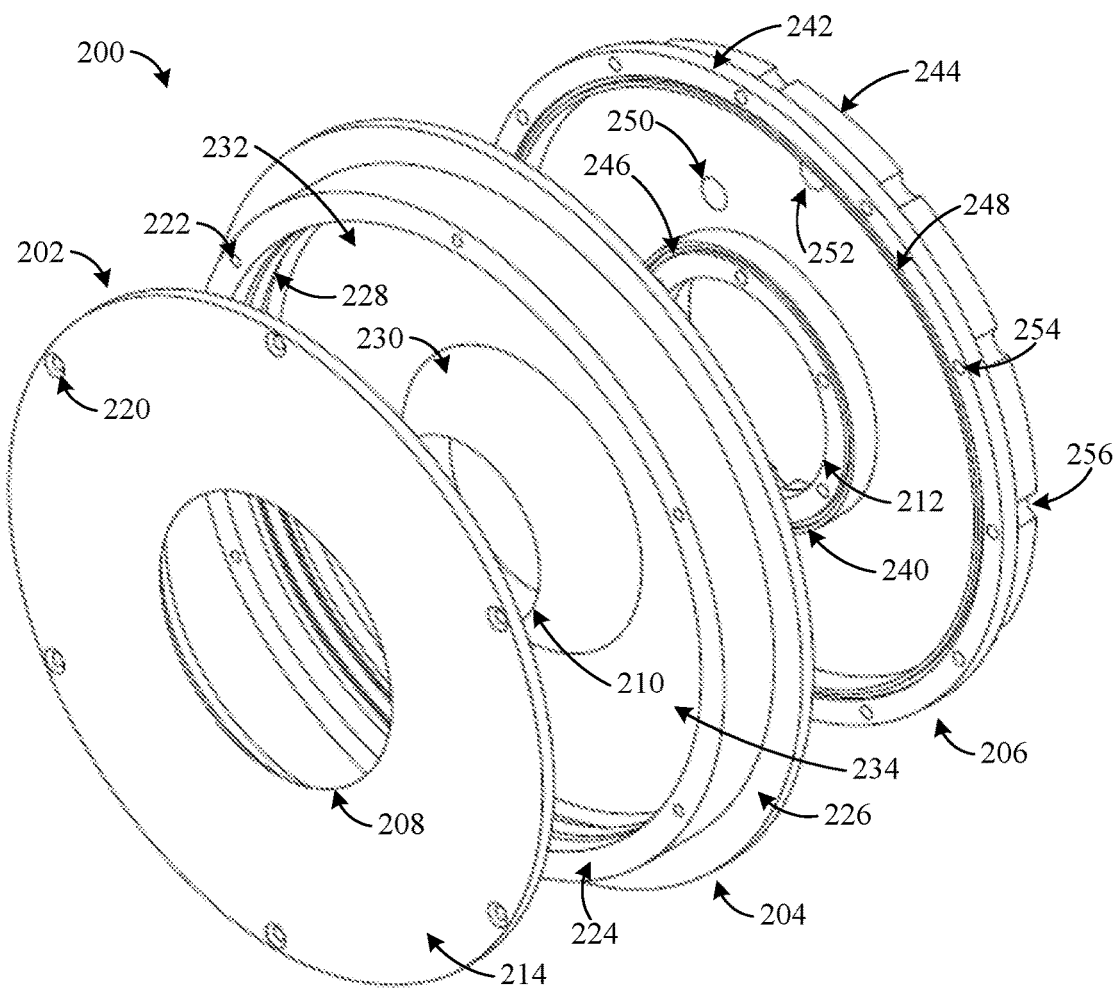
FIGS. 2A and 2B illustrate an example integrated beam scraper and power dump according to this disclosure.
Figure 2B:
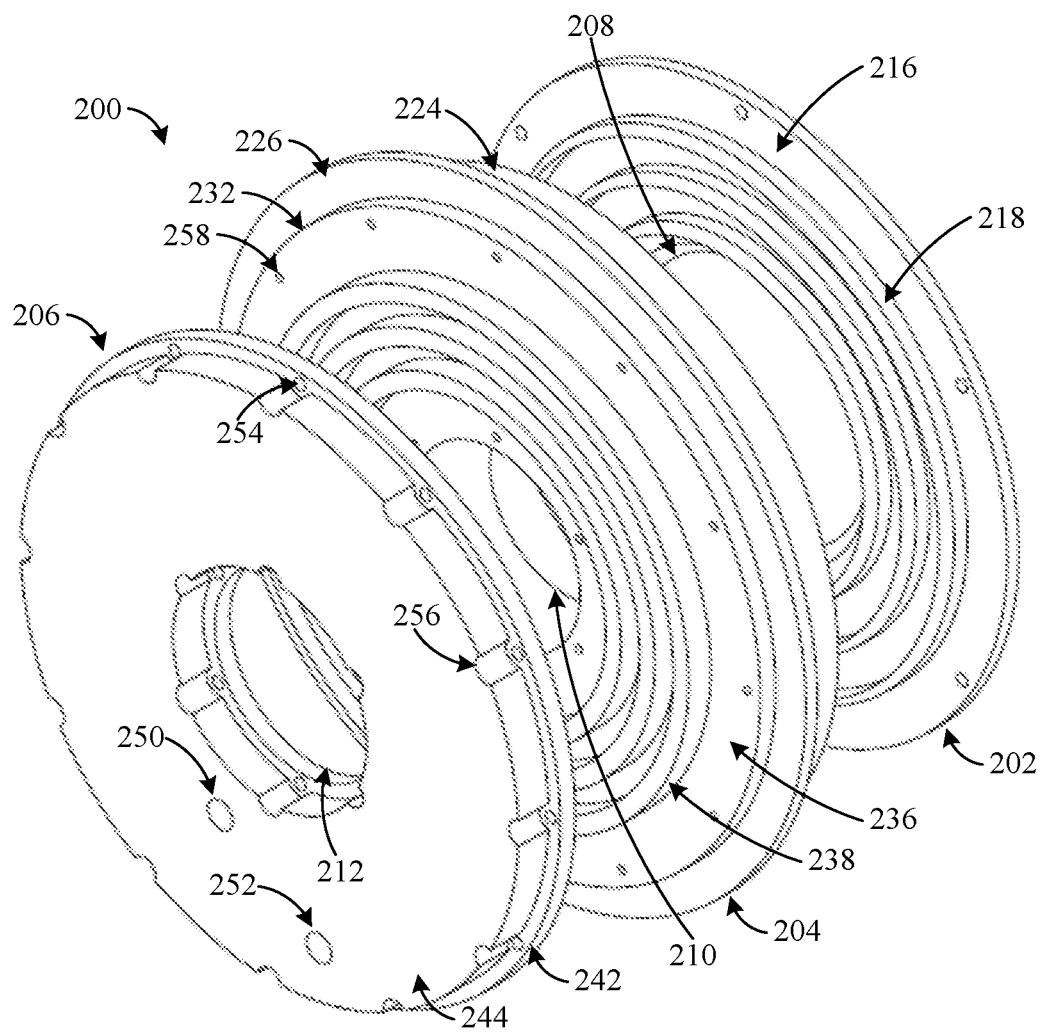
Figure 3:
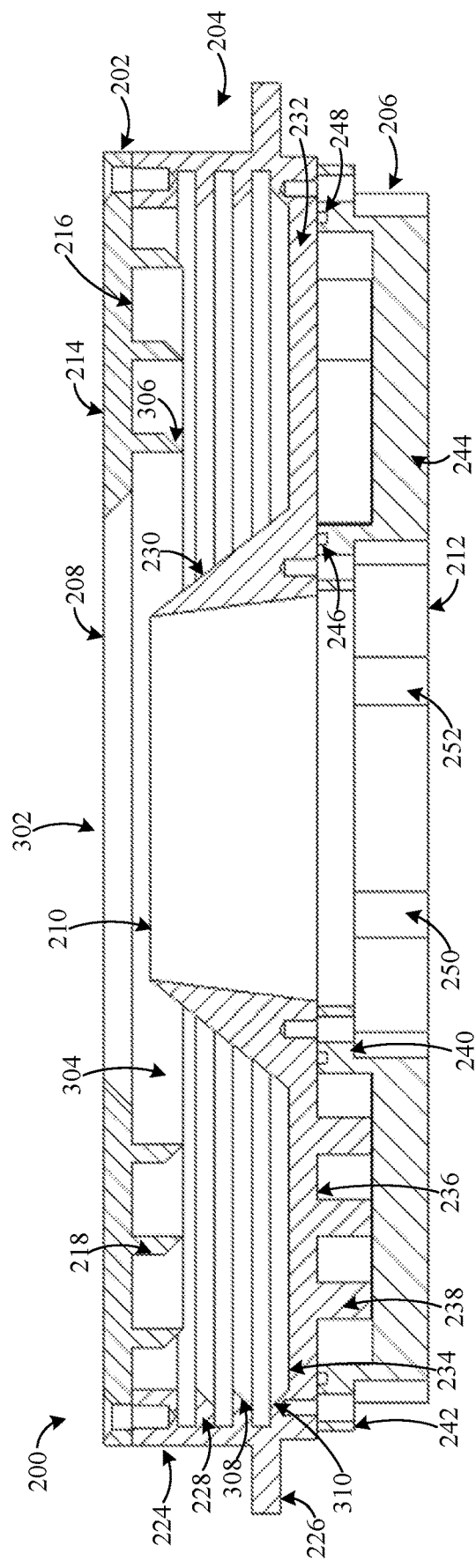
FIG. 3 illustrates an example cross-section of the integrated beam scraper and power dump of FIGS. 2A and 2B according to this disclosure.

FIGS. 2A and 2B illustrate an example integrated beam scraper and power dump 200 according to this disclosure. FIG. 3 illustrates an example cross-section of the integrated beam scraper and power dump 200 of FIGS. 2A and 2B according to this disclosure. In particular, FIG. 3 illustrates an example cross-section of the beam scraper and power dump 200 after the components shown in FIGS. 2A and 2B have been assembled. The beam scraper and power dump 200 may, for example, represent either or both of the beam scrapers and power dumps 118a-118b shown in FIG. 1 and described above. For ease of explanation, the beam scraper and power dump 200 shown in FIGS. 2A, 2B, and 3 may be described as being used in the laser system 100 of FIG. 1. However, the beam scraper and power dump 200 may be used in any other suitable system.

As shown in FIGS. 2A, 2B, and 3, the beam scraper and power dump 200 generally includes a cover 202, a beam scraper/power dump base 204, and a cooling manifold 206. The cover 202 includes an opening 208, the beam scraper/power dump base 204 includes an opening 210, and the cooling manifold 206 includes an opening 212. These openings 208, 210, and 212 collectively form an aperture 302 of the beam scraper and power dump 200 through which at least part of an optical beam (such as a high-power output beam) can pass.

During use, an optical beam can pass through the opening 208 of the cover 202 and be scraped by the beam scraper/power dump base 204, generally with the bulk of the optical beam passing through the opening 210 of the beam scraper/power dump base 204. The non-scraped portion or portions of the optical beam pass through the opening 212 of the cooling manifold 206 and exit the beam scraper and power dump 200. The cover 202 is attached to the beam scraper/power dump base 204 to form a cavity 304 in the beam scraper and power dump 200. In this example, the cavity 304 is annular and elongated in the radial direction. This means that the cavity 304 has a larger dimension in a direction perpendicular to a longitudinal axis of the beam scraper and power dump 200 (defined through a center of the aperture 302) and a smaller dimension in a direction parallel to a longitudinal axis of the beam scraper and power dump 200. However, the cavity 304 may have any other suitable size and shape, such as a shape in which its height is about equal to its width. As described in more detail below, optical energy (such as laser energy) reflected by the beam scraper/power dump base 204 enters the cavity 304 and is absorbed by the beam scraper and power dump 200, thereby converting that optical energy into thermal energy. This thermal energy can then be removed from the beam scraper and power dump 200 in any suitable manner, such as via the use of a fluid coolant flowing into and out of the beam scraper and power dump 200 through the cooling manifold 206.

Figure 4A:
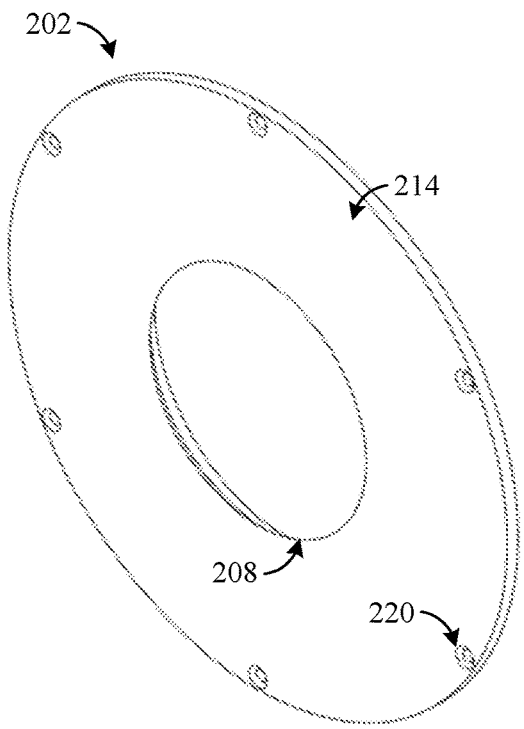
FIGS. 4A through 4C illustrate an example cover of the integrated beam scraper and power dump of FIGS. 2A and 2B according to this disclosure.
Figure 4B:
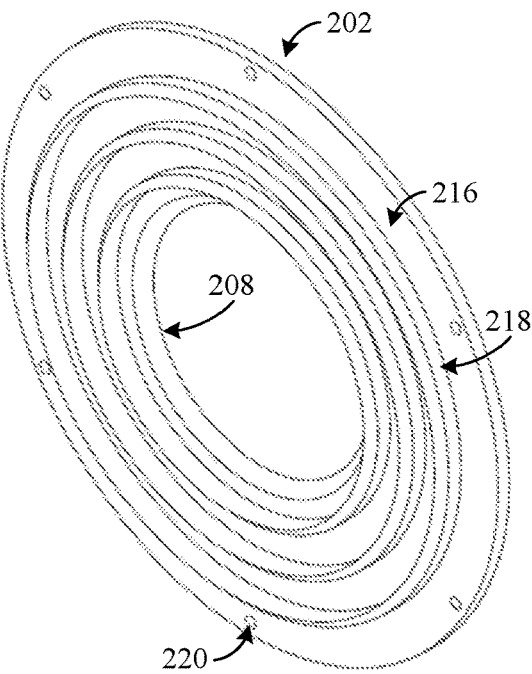
Figure 4C:
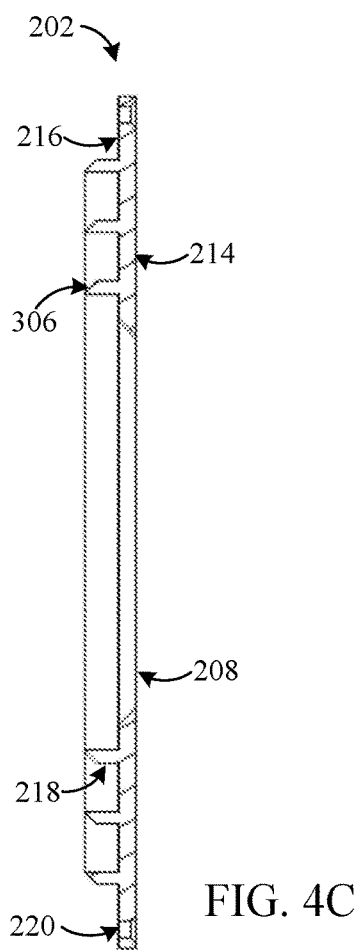
Figure 5A:
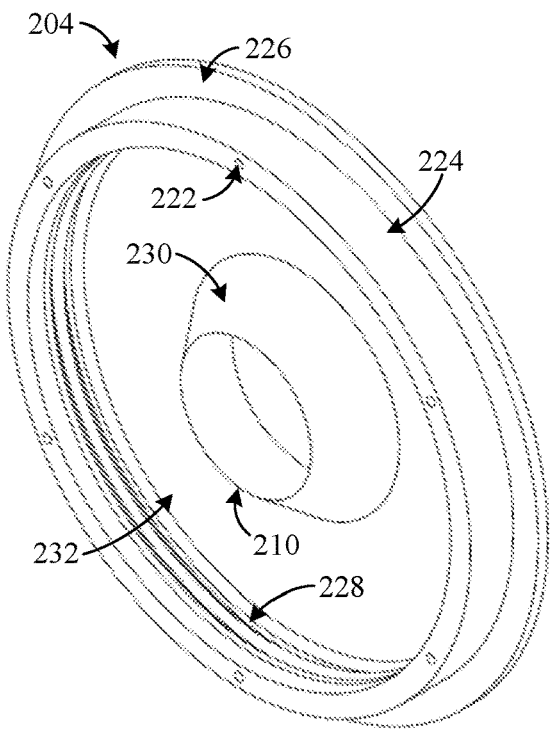
FIGS. 5A through 5C illustrate an example beam scraper/power dump base of the integrated beam scraper and power dump of FIGS. 2A and 2B according to this disclosure.
Figure 5B:
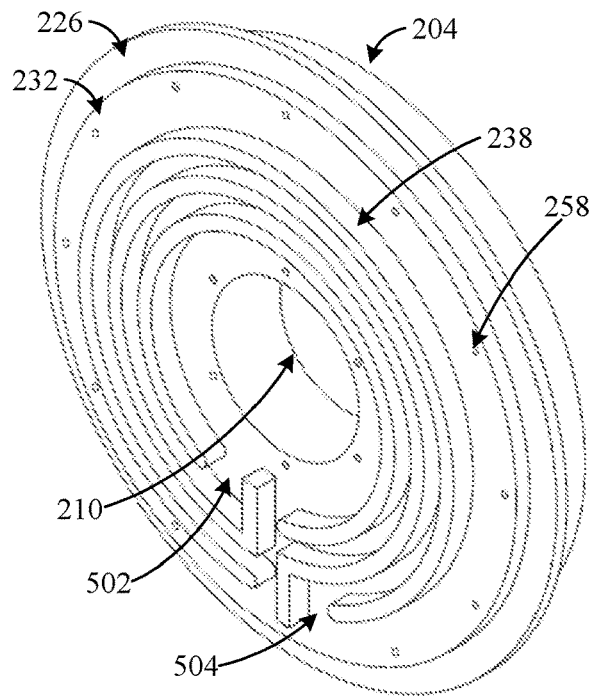
Figure 5C:
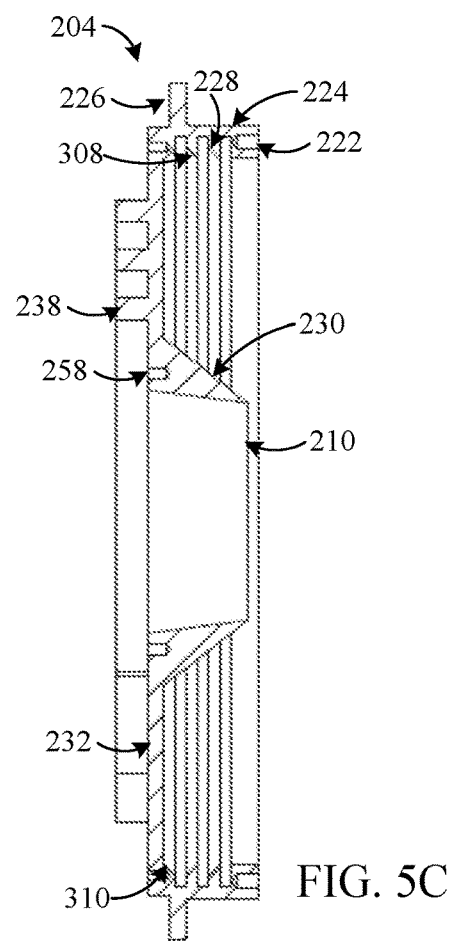
Figure 6A:
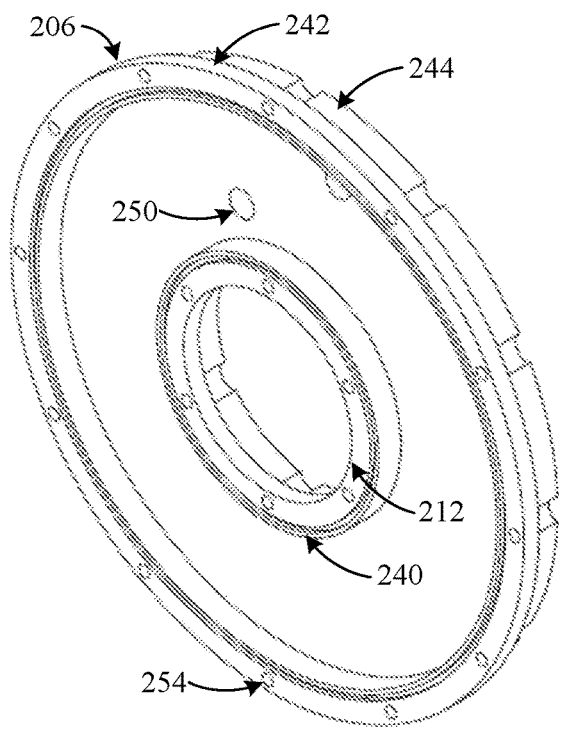
FIGS. 6A through 6C illustrate an example cooling manifold of the integrated beam scraper and power dump of FIGS. 2A and 2B according to this disclosure.
Figure 6B:
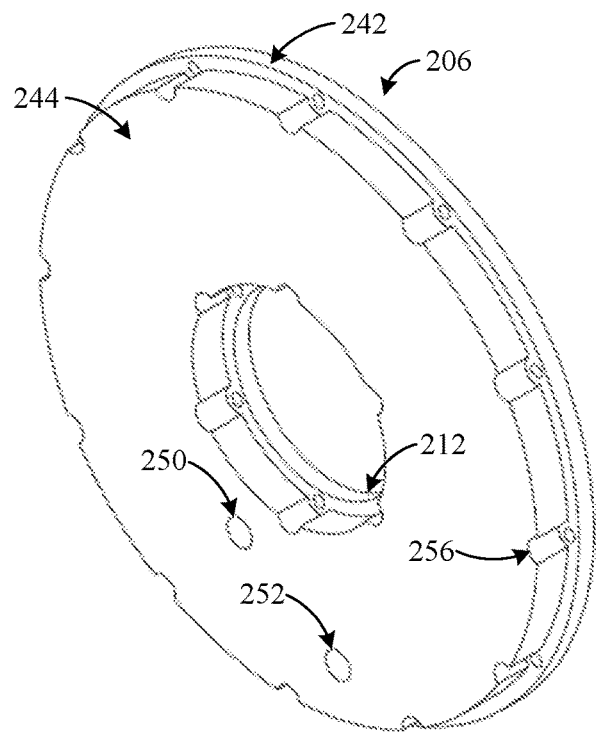
Figure 6C:
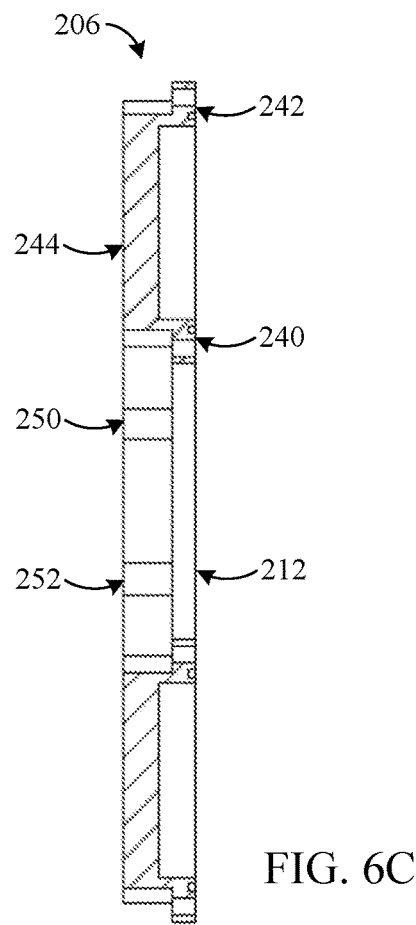

The cover 202, beam scraper/power dump base 204, and cooling manifold 206 are now described in greater detail. FIGS. 4A through 4C illustrate an example cover 202 of the integrated beam scraper and power dump 200 of FIGS. 2A and 2B according to this disclosure. FIGS. 5A through 5C illustrate an example beam scraper/power dump base 204 of the integrated beam scraper and power dump 200 of FIGS. 2A and 2B according to this disclosure. FIGS. 6A through 6C illustrate an example cooling manifold 206 of the integrated beam scraper and power dump 200 of FIGS. 2A and 2B according to this disclosure.

In the example shown here, the cover 202 includes an anterior surface 214 and a posterior surface 216, and one or more baffles 218 extend or project from the posterior surface 216 of the cover 202. When the cover 202 is attached to the beam scraper/power dump base 204, the baffles 218 extend or project into the cavity 304 within the beam scraper and power dump 200. In this particular example, the cover 202 is substantially circular in shape, the anterior surface 214 of the cover 202 is generally planar, and the posterior surface 216 of the cover 202 is generally planar except in locations where the baffles 218 project from the posterior surface 216. However, the cover 202 can have any other suitable shape, and the anterior surface 214 and the posterior surface 216 of the cover 202 need not be generally planar. Also, in this particular example, the opening 208 in the cover 202 is frustoconical in shape, meaning the opening 208 has the shape of a truncated cone with a slanted side. Thus, the opening 208 has a smaller width or size along the anterior surface 214 of the cover 202 and a larger width or size along the posterior surface 216 of the cover 202. This shape of the opening 208 allows optical energy having a larger angle of incidence to enter the cavity 304 and be captured by the beam scraper and power dump 200. Note, however, that the opening 208 may have any other suitable shape.

The baffles 218 on the posterior surface 216 of the cover 202 are used to help confine optical energy that enters the cavity 304 within the cavity 304, thereby helping to reduce or prevent the optical energy from escaping the cavity 304. Each of the baffles 218 includes an angled portion 306, which is slanted so that the thickness of the baffle 218 tapers moving away from a center of the cover 202 towards the outer perimeter of the cover 202. This angling may allow optical energy reflected from the beam scraper/power dump base 204 to travel farther into the cavity 304. This angling also helps to reflect optical energy away from the opening 208 to keep the optical energy within the cavity 304. In this particular example, each baffle 218 extends completely around the opening 208 of the cover 202, and there are three baffles 218 used in this example. However, each baffle 218 may have any other suitable shape and may or may not individually extend completely around the opening 208 of the cover 202, and any suitable number of baffles 218 may be used here (including a single baffle 218). In other embodiments, the baffles 218 can be omitted from the cover 202.

The cover 202 can be attached to the beam scraper/power dump base 204 in any suitable manner. In this particular example, the cover 202 can be attached to the beam scraper/power dump base 204 using bolts, screws, or similar connectors. These connectors can be inserted into countersunk or counterbore holes 220 in the cover 202 and into threaded holes 222 in the beam scraper/power dump base 204. However, any other suitable techniques may be used to attach the cover 202 and the beam scraper/power dump base 204, such as brazing or welding.

In the example shown here, the beam scraper/power dump base 204 includes an outer wall 224 and a flange 226 extending from the outer wall 224. The outer wall 224 extends a specified distance from the flange 226 in order to help define the cavity 304 of the beam scraper and power dump 200. In this particular example, the outer wall 224 is annular/circular in shape and has a generally smooth outer surface. However, the outer wall 224 can have any other suitable shape. The flange 226 extends from the outer wall 224 and may be used to facilitate transport or mounting of the beam scraper and power dump 200, such as when the flange 226 can be clamped to another structure or when the flange 226 includes holes suitable for passage of bolts, screws, or similar connectors. In this particular example, the flange 226 is annular/circular in shape, has generally smooth top, bottom, and side surfaces, and extends completely around the outer perimeter of the beam scraper/power dump base 204. However, the flange 226 can have any other suitable shape and may or may not extend completely around the outer perimeter of the beam scraper/power dump base 204.

An inner surface of the outer wall 224 includes one or more baffles 228 that extend or project from the inner surface of the outer wall 224. The baffles 228 extend or project into the cavity 304 within the beam scraper and power dump 200. Similar to the baffles 218, the baffles 228 on the outer wall 224 are used to help confine optical energy that enters the cavity 304 within the cavity 304, thereby helping to reduce or prevent the optical energy from escaping the cavity 304. Each of the baffles 228 includes an angled portion 308, which is slanted so that the thickness of the baffle 218 tapers moving from the anterior of the beam scraper/power dump base 204 to the posterior of the beam scraper/power dump base 204. This angling may help to keep optical energy that has entered the cavity 304 from escaping the cavity 304. In this particular example, each baffle 228 extends completely around the opening 210 of the beam scraper/power dump base 204, and there are two baffles 228 used in this example. However, each baffle 228 may have any other suitable shape and may or may not individually extend completely around the opening 210 of the beam scraper/power dump base 204, and any suitable number of baffles 228 may be used here (including a single baffle 228). In other embodiments, the baffles 228 can be omitted from the beam scraper/power dump base 204. Also, in this particular example, the baffles 218 and 228 project into the cavity 304 in orthogonal directions, although this need not be the case.

The beam scraper/power dump base 204 also includes a raised surface 230. The raised surface 230 can be used to absorb and/or reflect optical energy that travels into the beam scraper/power dump base 204 through the cover 202 but that does not pass through the opening 210 of the beam scraper/power dump base 204. Instead, this optical energy strikes the raised surface 230 and is absorbed by the raised surface 230 or is reflected into the cavity 304 of the beam scraper and power dump 200 for absorption. Among other things, the raised surface 230 can help to reshape an optical beam passing through the beam scraper and power dump 200. The raised surface 230 therefore forms or is included within the beam scraper stage of the beam scraper and power dump 200.

Whether the raised surface 230 is used primarily to absorb or reflect optical energy may depend on various factors, such as the power level of the incoming optical energy. At higher power levels, for example, the raised surface 230 may be highly-reflective, such as to distribute scraped optical energy into the cavity 304 for absorption. At lower power levels, the raised surface 230 may be highly-absorptive, such as when adequate cooling of the raised surface 230 can be performed to prevent damage to the structure. Of course, it may also be possible for the raised surface 230 to be highly-absorptive at higher power levels or highly-reflective at lower power levels. Also, it should be noted that even when the raised surface 230 is highly-reflective, a small portion of the incoming optical energy is typically absorbed by the raised surface 230.

The raised surface 230 includes any suitable structure configured to scrape optical energy. When the raised surface 230 represents a reflective surface, the raised surface 230 may include a portion of the beam scraper/power dump base 204 that has been polished so it is highly reflective or that has been coated with a material that is highly reflective (at least at the wavelength or wavelengths of the optical energy). In some embodiments, the raised surface 230 can include a gold coating or gold plating on the beam scraper/power dump base 204. In other embodiments, the raised surface 230 can include a mirror or other optical device with a highly-reflective surface that is mounted on the beam scraper/power dump base 204. When the raised surface 230 represents an absorptive surface, the raised surface 230 may include a portion of the beam scraper/power dump base 204 that has been coated with a material that is highly absorptive (at least at the wavelength or wavelengths of the optical energy). In some embodiments, the raised surface 230 can include black-chrome plating.

In this particular example, the raised surface 230 is frustoconical in shape, meaning the raised surface 230 has the shape of a truncated cone with a slanted side. Thus, the raised surface 230 has a smaller width or size anterior and a larger width or size posterior. The opening 210 of the beam scraper/power dump base 204 passes through the raised surface 230 and allows passage for optical energy through the raised surface 230. In this particular example, the opening 210 is also frustoconical in shape, meaning the opening 210 has the shape of a truncated cone with a slanted side. Thus, the opening 210 has a smaller width or size anterior and a larger width or size posterior. However, the raised surface 230 and the opening 210 may each have any other suitable shape.

A connecting plate 232 joins the raised surface 230 to the outer wall 224. The connecting plate 232 can also be used to absorb optical energy that enters the cavity 304. In this particular example, the connecting plate 232 includes a generally planar anterior surface 234, except in locations where an angled portion 310 joins the connecting plate 232 to the outer wall 224. The angled portion 310 of the connecting plate 232 can help to reflect optical energy within the cavity 304, although the angled portion 310 may be omitted if desired. Also, in this particular example, the connecting plate 232 includes a generally planar posterior surface 236, except in locations where projections 238 extend or project from the posterior surface 236 of the connecting plate 232. However, the connecting plate 232 may have any other suitable shape.

The projections 238 are used to define one or more flow channels, which are configured to transport fluid coolant between the beam scraper/power dump base 204 and the cooling manifold 206 (once the beam scraper/power dump base 204 is attached to the cooling manifold 206). These flow channels allow the fluid coolant to flow next to, around, or near one or more portions of the beam scraper/power dump base 204 in order to remove thermal energy (heat) from the beam scraper and power dump 200. The fluid coolant can enter and exit the beam scraper and power dump 200 through the cooling manifold 206 as described below. In this particular example, the flow channels generally extend circularly around the opening 210 of the beam scraper/power dump base 204, although there are two locations 502 and 504 where this circular pattern is interrupted to allow for inlet and outlet of the fluid coolant. Note, however, that any other suitable flow channel or flow channels can be used in the beam scraper/power dump base 204. Also note that the use of projections 238 on the posterior surface 236 of the connecting plate 232 represents one way of forming flow channels, although other cooling mechanisms can be used with the beam scraper and power dump 200.

Various surfaces described above form the cavity 304 of the beam scraper and power dump 200. In particular, the cavity 304 in this example is formed or surrounded by the posterior surface 216 of the cover 202 (optionally with the baffles 218), the inner surface of the outer wall 224 (optionally with the baffles 228), and the anterior surface 234 of the connecting plate 232 (optionally with the angled portion 310). These portions of the various components therefore form or are included within the power dump stage of the beam scraper and power dump 200. These portions of the components can absorb optical energy that is reflected into the cavity 304 by the raised surface 230. To help facilitate absorption of the optical energy, at least these portions of the components can be coated, plated, or otherwise covered by a material that is highly-absorptive (at least at the wavelength or wavelengths of the optical energy). In some embodiments, these portions of the components can include black-chrome plating or other absorptive material.

In the example shown here, the cooling manifold 206 includes an inner wall 240, a flange 242, and a connecting plate 244. The inner wall 240 generally denotes a portion of the cooling manifold 206 that can be inserted between the projections 238 of the beam scraper/power dump base 204 and that can contact the posterior surface of the raised surface 230 or the connecting plate 232. The flange 242 generally denotes a portion of the cooling manifold 206 that can be placed around the projections 238 of the beam scraper/power dump base 204 and that can contact the posterior surface of the outer wall 224 or the connecting plate 232. The connecting plate 244 generally denotes a portion of the cooling manifold 206 that connects the inner wall 240 and the flange 242. In this particular example, the inner wall 240, the flange 242, and the connecting plate 244 are substantially annular/circular in shape, although each of these components can have any other suitable shape.

A space between the outer surface of the inner wall 240 and the inner surface(s) the flange 242/connecting plate 244 represents the space occupied by the flow channel or the flow channels defined by the projections 238. A seal 246 in the inner wall 240 of the cooling manifold 206 and a seal 248 in the flange 242 of the cooling manifold 206 can be used to prevent fluid coolant from escaping the flow channel or flow channels defined by the beam scraper/power dump base 204 and the cooling manifold 206. The seals 246 and 248 may represent any suitable structures for preventing fluid leakage, such as rubber or other O-rings.

The cooling manifold 206 also includes at least two ports 250 and 252 that allow fluid coolant to enter and exit the beam scraper and power dump 200. The ports 250 and 252 here are located at different locations along the connecting plate 244. In this particular example, the port 250 generally aligns with the location 502, and the port 252 generally aligns with the location 504. As a result, fluid coolant can pass through one of the ports 250 and 252, travel along the flow channel(s) defined by the projections 238 of the beam scraper/power dump base 204, and pass through the other of the ports 250 and 252. This allows the fluid coolant to be used to remove thermal energy from at least part of the beam scraper and power dump 200. While the cooling manifold 206 here includes a single inlet port and a single outlet port for fluid coolant, the cooling manifold 206 may include multiple inlet ports and/or multiple outlet ports for the fluid coolant. The arrangement of the inlet and outlet ports 250 and 252 can depend (at least partially) on the flow channels defined by the projections 238.

The cooling manifold 206 can be attached to the beam scraper/power dump base 204 in any suitable manner. For example, the cooling manifold 206 can be attached to the beam scraper/power dump base 204 using bolts, screws, or similar connectors. In this particular example, the inner wall 240 and the flange 242 include various holes 254 positioned along both the outer perimeter and the inner perimeter of the cooling manifold 206, and the cooling manifold 206 can have various recesses 256 adjacent to the holes 254 to facilitate easier access to the holes 254. The holes 254 allow bolts, screws, or similar connectors to pass through the cooling manifold 206 into corresponding threaded holes 258 in the beam scraper/power dump base 204. However, any other suitable techniques may be used to attach the cooling manifold 206 and the beam scraper/power dump base 204, such as brazing or welding.

The integrated beam scraper and power dump 200 described above can be used in various laser systems to support beam re-sizing or other operations that involve beam scraping and power dumping. Example applications for the beam scraper and power dump 200 are described above with respect to FIG. 1. One advantage of the beam scraper and power dump 200 here is that the overall structure can be easily scaled up or down in size to accommodate a desired beam size. Also, the materials used in the beam scraper and power dump 200 can be selected appropriately and based on the expected power level of the optical beam to be scraped. For instance, different types of black-chrome plating may be able to withstand different maximum temperatures, such as maximum temperatures from about 260° C. to about 482° C. As another example, the raised surface 230 may not need a highly-reflective or highly-absorptive coating and may simply represent a reflective or absorptive portion of the beam scraper and power dump substrate.

Although FIGS. 2A and 2B illustrate one example of an integrated beam scraper and power dump 200, FIG. 3 illustrates one example of the cross-section of the integrated beam scraper and power dump 200, and FIGS. 4A through 6C illustrate examples of components in the integrated beam scraper and power dump 200, various changes may be made to FIGS. 2A through 6C. For example, the relative sizes, shapes, and dimensions of the various components in the beam scraper and power dump 200 are for illustration only. Also, various components shown in FIGS. 2A through 6C may be rearranged or omitted and additional components may be added according to particular needs. For instance, there may be some embodiments in which fluid cooling of the beam scraper and power dump 200 may not be needed or required, in which case the cooling manifold 206 and optionally the projections 238 of the beam scraper/power dump base 204 may be omitted. It is also possible to use other cooling mechanisms with the beam scraper and power dump 200, such as by attaching radiating fins to the posterior surface of the beam scraper/power dump base 204 or by using other fluid cooling mechanisms or other cooling mechanisms in or with the beam scraper/power dump base 204.

Figure 7:
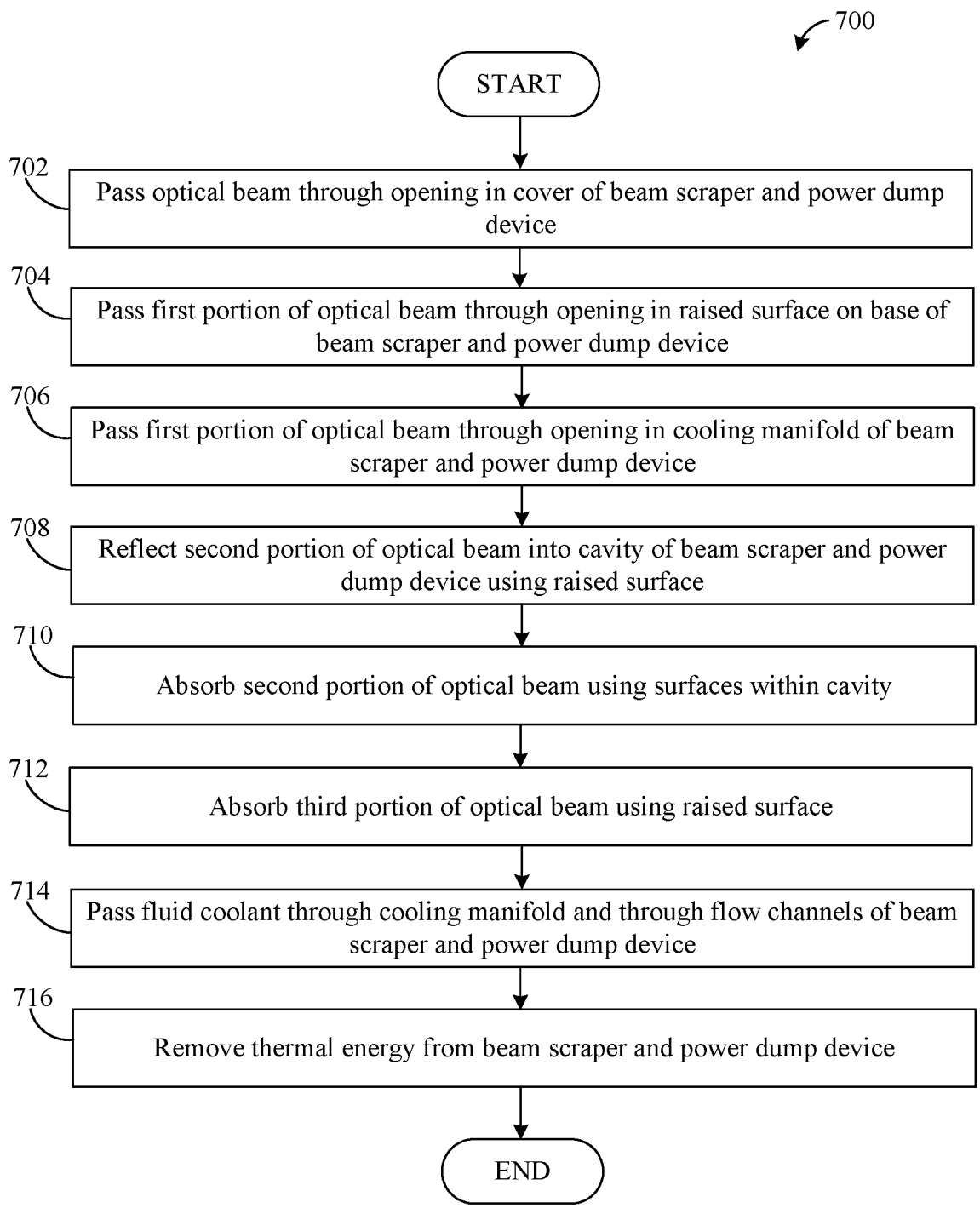
FIG. 7 illustrates an example method for using an integrated beam scraper and power dump according to this disclosure.

FIG. 7 illustrates an example method 700 for using an integrated beam scraper and power dump according to this disclosure. For ease of explanation, the method 700 of FIG. 7 is described as involving the use of the integrated beam scraper and power dump 200 of FIGS. 2A through 6C in the laser system 100 of FIG. 1. However, the method 700 may involve the use of any other suitable beam scraper and power dump designed in accordance with this disclosure, and the beam scraper and power dump may be used in any other suitable system.

As shown in FIG. 7, an optical beam passes through an opening in a cover of a beam scraper and power dump device at step 702. This may include, for example, passing an optical beam through the opening 208 in the cover 202 of the beam scraper and power dump 200. As a particular example, this may include passing the high-power optical signals 112 or the high-power output beam 116 generated in the laser system 100 of FIG. 1 through the opening 208 in the cover 202 of the beam scraper and power dump 200. A first portion of the optical beam passes through an opening in a raised surface located on a base of the beam scraper and power dump device at step 704. This may include, for example, passing an un-reflected portion of the optical beam through the opening 210 in the raised surface 230 located on the beam scraper/power dump base 204 of the beam scraper and power dump 200. The first portion of the optical beam passes through an opening in a cooling manifold of the beam scraper and power dump device at step 706. This may include, for example, passing the un-reflected portion of the optical beam through the opening 212 in the cooling manifold 206 of the beam scraper and power dump 200. The optical output that exits the cooling manifold 206 represents a resized, reshaped, or other scraped optical beam.

A second portion of the optical beam is reflected into a cavity of the beam scraper and power dump device using the raised surface located on the base of the beam scraper and power dump device at step 708. This may include, for example, the raised surface 230 located on the beam scraper/power dump base 204 of the beam scraper and power dump 200 reflecting one or more outer portions or other portions of the optical beam. This may also include the reflected portion(s) of the optical beam entering into the cavity 304 of the beam scraper and power dump 200, where the cavity 304 is formed between the cover 202 and the beam scraper/power dump base 204 of the beam scraper and power dump 200. As noted above, in some embodiments, a gold coating/plating or other highly-reflective material may be used to form the raised surface 230 so that substantially no optical energy is absorbed by the raised surface 230. In other embodiments, a black-chrome plating or other highly-absorptive material may be used to form the raised surface 230 so that little optical energy is reflected by the raised surface 230.

All or substantially all of the reflected second portion of the optical beam is absorbed by one or more surfaces within the cavity at step 710. This may include, for example, the posterior surface 216 of the cover 202 with the baffles 218, the inner surface of the outer wall 224 with the baffles 228, and the anterior surface 234 of the connecting plate 232 with the angled portion 310 absorbing the reflected optical energy. As noted above, a black-chrome plating or other highly-absorptive material may be used on these surfaces to facilitate absorption of the reflected optical energy. A third portion of the optical energy may be absorbed by the raised surface of the beam scraper and power dump device at step 712. This may include, for example, the raised surface 230 absorbing a very small amount of the optical energy if the raised surface 230 is highly-reflective or absorbing a much larger amount of the optical energy if the raised surface 230 is highly-absorptive.

A fluid coolant passes through the cooling manifold and through one or more flow channels of the beam scraper and power dump device at step 714. This may include, for example, passing the fluid coolant through the ports 250 and 252 of the cooling manifold 206. This may also include passing the fluid coolant through one or more flow channels positioned between the beam scraper/power dump base 204 and the cooling manifold 206 and defined by the projections 238. Thermal energy is removed from the beam scraper and power dump device at step 716. This may include, for example, the fluid coolant absorbing thermal energy created in the cover 202 and the beam scraper/power dump base 204 based on the absorption of the reflected optical energy.

Although FIG. 7 illustrates one example of a method 700 for using an integrated beam scraper and power dump, various changes may be made to FIG. 7. For example, while shown as a series of steps, various steps in FIG. 7 may overlap, occur in parallel, or occur any number of times. Also, as noted above, certain components of the beam scraper and power dump 200 may be omitted, such as when the cooling manifold 206 is omitted when fluid cooling of the beam scraper and power dump 200 is not needed or desired. Thus, one or more corresponding steps in FIG. 7 may also be omitted, such as when step 712 is omitted.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "device," "component," "element," "apparatus," or "system" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a base comprising a raised surface and a first opening through the raised surface; and
   a cover configured to be coupled to the base in order to form a cavity, the cover comprising a second opening through the cover;
   wherein the raised surface is configured to allow passage of a first portion of optical energy through the first opening and to reflect a second portion of the optical energy; and
   wherein portions of the cover and the base surrounding the cavity are configured to absorb the reflected second portion of the optical energy.

2. The apparatus of claim 1, wherein the base further comprises one or more baffles positioned around the raised surface.

3. The apparatus of claim 1, wherein the cover further comprises one or more baffles positioned around the second opening.

4. The apparatus of claim 1, further comprising:
   a cooling manifold configured to be coupled to the base; and
   one or more flow channels positioned between the cooling manifold and the base, the one or more flow channels configured to transport a fluid coolant in order to remove thermal energy from the apparatus.

5. The apparatus of claim 4, wherein:
   a surface of the base includes one or more projections that define the one or more flow channels; and
   the cooling manifold further comprises multiple seals positioned on opposite sides of a space within the cooling manifold, the space configured to receive the one or more projections.

6. The apparatus of claim 1, wherein the raised surface is further configured to absorb a third portion of the optical energy.

7. The apparatus of claim 1, wherein:
   the first and second openings at least partially define an aperture through the apparatus, a longitudinal axis of the apparatus extending through a center of the aperture; and
   the cavity is annular and has a larger dimension in a direction perpendicular to the longitudinal axis and a smaller dimension in a direction parallel to the longitudinal axis.

8. A system comprising:
   a laser configured to generate an optical beam; and a beam scraper and power dump configured to scrape the optical beam, the beam scraper and power dump comprising:
- a base comprising a raised surface and a first opening through the raised surface; and
- a cover configured to be coupled to the base in order to form a cavity, the cover comprising a second opening through the cover;

wherein the raised surface is configured to allow passage of a first portion of the optical beam through the first opening and to reflect a second portion of the optical beam; and wherein portions of the cover and the base surrounding the cavity are configured to absorb the reflected second portion of the optical beam.

9. The system of claim 8, wherein the base further comprises one or more baffles positioned around the raised surface.

10. The system of claim 8, wherein the cover further comprises one or more baffles positioned around the second opening.

11. The system of claim 8, wherein the beam scraper and power dump further comprises:
- a cooling manifold configured to be coupled to the base; and
- one or more flow channels positioned between the cooling manifold and the base, the one or more flow channels configured to transport a fluid coolant in order to remove thermal energy from the beam scraper and power dump.

12. The system of claim 11, wherein:
- a surface of the base includes one or more projections that define the one or more flow channels; and
- the cooling manifold further comprises multiple seals positioned on opposite sides of a space within the cooling manifold, the space configured to receive the one or more projections.

13. The system of claim 8, wherein the raised surface is further configured to absorb a third portion of the optical beam.

14. The system of claim 8, wherein:
the first and second openings at least partially define an aperture through the beam scraper and power dump, a longitudinal axis of the beam scraper and power dump extending through a center of the aperture; and
the cavity is annular and has a larger dimension in a direction perpendicular to the longitudinal axis and a smaller dimension in a direction parallel to the longitudinal axis.

15. The system of claim 8, wherein:
the laser comprises a master oscillator and a power amplifier; and
the beam scraper and power dump is configured to scrape the optical beam as generated by the power amplifier.

16. The system of claim 8, wherein:
the laser comprises an output expander and collimator; and
the beam scraper and power dump is configured to scrape the optical beam as generated by the output expander and collimator.

17. A method comprising:
passing an optical beam through a cover of a beam scraper and power dump;
passing a first portion of the optical beam through an opening in a raised surface located on a base of the beam scraper and power dump;
reflecting a second portion of the optical beam from the raised surface into a cavity of the beam scraper and power dump; and
absorbing the reflected second portion of the optical beam using portions of the cover and the base surrounding the cavity.

18. The method of claim 17, wherein baffles on the cover and the base extend into the cavity, the baffles confining the reflected second portion of the optical beam within the cavity.

19. The method of claim 17, further comprising:
providing fluid coolant through a cooling manifold and through one or more flow channels positioned between the cooling manifold and the base; and
removing thermal energy from the beam scraper and power dump using the fluid coolant.

20. The method of claim 17, further comprising:
absorbing a third portion of the optical beam using the raised surface.

* * * * *